United States Patent [19]

List

[11] 3,854,615

[45] Dec. 17, 1974

[54] TRUSS CARRIER

[76] Inventor: William G. List, 7718 Lettie, Houston, Tex. 77034

[22] Filed: June 8, 1973

[21] Appl. No.: 368,204

[52] U.S. Cl............... 214/501, 214/77 R, 214/152
[51] Int. Cl............................................... B60p 1/16
[58] Field of Search............. 214/77 R, 78, 80, 501, 214/505, 152; 298/8, 17.6, 18

[56] References Cited
UNITED STATES PATENTS

| | | | |
|---|---|---|---|
| 2,781,924 | 2/1957 | Hughes | 214/77 R |
| 3,091,498 | 5/1963 | Goodwin | 214/77 R X |
| 3,399,791 | 9/1968 | Goodwin | 214/77 R |

Primary Examiner—Robert J. Spar
Assistant Examiner—Leslie J. Paperner

[57] ABSTRACT

A truss carrier comprising an elongate chassis and including front and rear frame means affixed to the ends thereof, the carrier being characterized by a longitudinal axis, a pair of load support means each pivotally mounted on both the front and rear frame means on either side of the longitudinal axis, the rear support means being pivotally mounted a greater distance from said longitudinal axis than the front support means so that outward pivoting of the rear support means produces concomitant movement of the front support means when they are carrying a common load.

9 Claims, 3 Drawing Figures

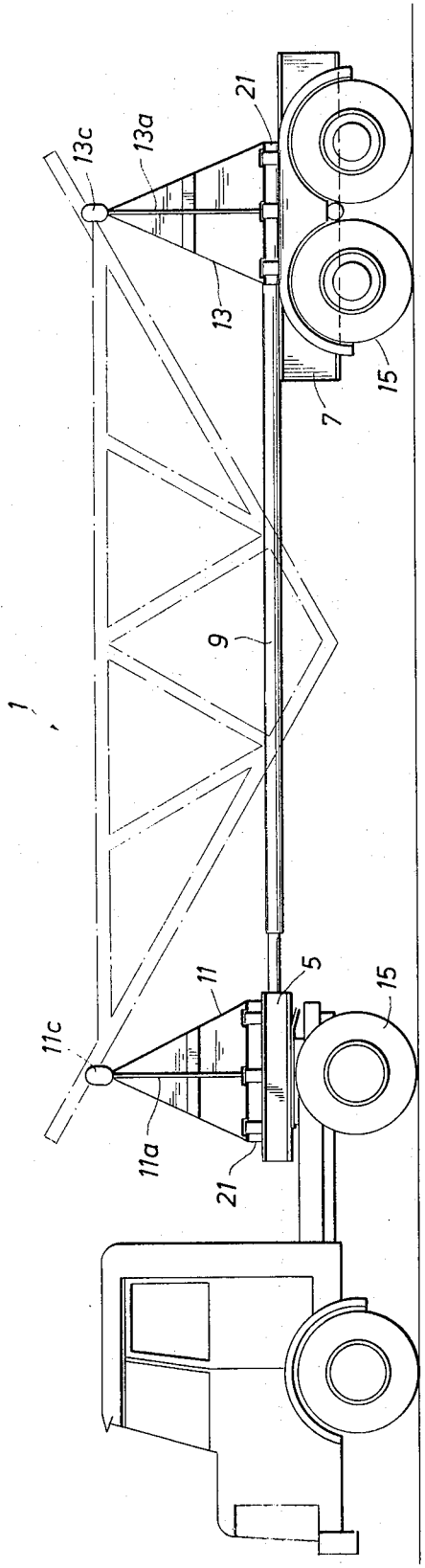
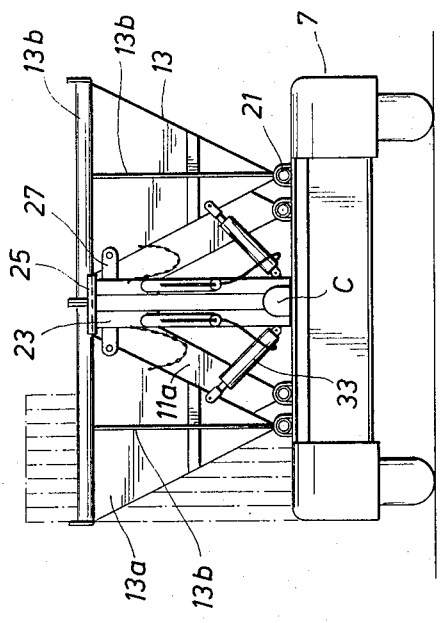
FIG.1
FIG.2
FIG.3

TRUSS CARRIER

BACKGROUND OF THE INVENTION

1. Field of the Invention

The present invention relates to specialized vehicle means for transporting a load. It is more particularly concerned with a vehicle means which may take the form of a trailer or carrier for transporting and unloading building trusses.

2. Description of the Prior Art

The use of lateral or side unloading carriers is well known and has been the subject of numerous United States Letters Patent. A number of the known lateral unloading carriers are directed to the transportation and unloading of unwieldy cargo such as prefabricated building trusses. Such prefabricated building trusses are generally of triangular configuration and are therefore difficult to handle because of their bulk and shape. One of the more common types of prior art carrier designs for handling and transporting building trusses comprises pivoted front and rear frame members disposed on a rolling trailer The pivoted front and rear frame members are adapted to carry a common truss structure. The frame members are coaxially aligned with respect to their pivots and are adapted fo pivot outwardly in a coordinated manner in order to deposit the truss structure on the ground. Although this design provides an acceptable means for transporting such a load it is less than optimal in operation when the load is deposited on the ground because of the tendency of the truss structures to fall off the frame means during their pivotal movement, thereby causing damage to the truss load. Further, in such a design it is necessary to coordinate the angular pivotal movement of the front and rear frame members, this requiring coordinated application of unloading power to both the front and rear frame members. Such prior art approach to the transportation of a truss load also requires appropriate means for restraining the frame members after they have pivoted through a given angle, for at that point there occurs a shift in the load of truss members because of their natural tendency to fall to the ground.

BRIEF SUMMARY OF THE INVENTION

The present invention describes an improved carrier vehicle or structure for transporting and unloading unwieldy cargo, particularly prefabricated structural truss members. The truss carrier herein has as a principal advantage thereof, a structural design which unloads and deposits prefabricated structural trusses to the ground with much less force and hence less damage than has been accomplished with any of the known prior art carriers which are manufactured for this purpose. The ability to unload structural trusses with ease, and with the substantial elimination of the unloading damage characterizing prior art design, is in part attributable to certain modifications to existing truss carrier designs. The present invention, therefore, discloses a truss carrier structure which not only effectuates substantial savings to the owner thereof by reason of reduced damage to cargo, but which is relatively simple and inexpensive to build by comparison to known truss carrier designs, this by reason of the elimination of the previously used complex structure which characterized the front and rear pivoted frame members. Briefly the structure of the invention comprises an elongate chassis which includes the known front and rear frame means that are affixed at the ends thereof. The elongate chassis is characterized by a longitudinal axis and a pair of load support means mounted pivotally on each of the front and rear frame means. The pair of rear load support means are mounted one each on either side of the longitudinal axis. Similarly, the front load support means are mounted one each on either side of the longitudinal axis. The pivots for the rear support means, however, are disposed a greater distance from the longitudinal axis than are the pivots of the front support means. When a common load of trusses is supported by the pivoted front and rear load support means, actuation of the rear support means to pivot outwardly produces a concomitant movement of the front support means. If the truss load is disposed on the rear load support means at least partially interiorly of the pivot and on each side of the longitudinal axis the pivotal movement of the rear load support means will result in disposition of the trusses on to the ground with such ease and gentleness as to preclude damage thereto. Therefore, a principal feature and advantage of the present invention resides in a truss carrier design in which the weight of the load is disposed substantially interiorly of the rear load support means pivot, this being accomplished by disposition of the front load support means pivot being disposed interiorly of the rear pivot so that the front load support means restrains and retards sudden unloading of the cargo to the ground.

Another feature and advantage of the invention resides in a lateral unloading carrier for carrying building trusses and the like and which is characterized by safety stop means on the load support means, which safety stop means are easily disengaged in order to effectuate facile unloading of the carrier.

These and numerous other features and advantages of the invention will be more readily apparent upon a reading of the following specification, claims and drawings wherein like numerals denote like parts in the several views and wherein:

FIG. 1 is a side view showing an exemplary lateral unloading carrier in accordance with the principles hereof.

FIG. 2 is a rear view of the lateral unloading carrier of FIG. 1.

FIG. 3 is a rear view of the carrier of FIG. 1 and in which the unloading function has begun.

DETAILED DESCRIPTION

With reference now to FIG. 1 there is shown the lateral unloading carrier 1 which, for purposes of explanation herein, is demonstrated with reference to an elongate cargo such as prefabricated roof trusses T. The carrier 1 comprises a front frame means 5 and a rear frame means 7, the frame means being structurally coupled to one another by an elongate chassis 9 which may take the form of a beam or other appropriate structural arrangement. If the lateral unloading carrier is to be utilized for transporting trusses the rear frame means, or both the front and rear frame means, may be mounted on wheels 15. The front and rear support means 11, 13 each comprise a pair of pivoted structural plates, each of which consists of a triangular lateral plate 13(a) and a triangular longitudinal plate 13(b) welded to the lateral plate 13(a). As shown in the drawings this structural configuration for the front and rear support means optimally distributes the load of trusses T which bears upon the apex of the longitudinal plates over the base width of the lateral plates. And likewise, the load imposed upon the apex of the longitudinal plates is distributed over the base of the longitudinal plates so as to thereby increase the width of the pivot connection (explained hereafter) and thereby minimize possibility of binding due to torsional forces imposed by the longitudinal structural plates upon the pivots.

Each of the front and rear support means 11, 13 are pivotally mounted on the upper surface of their respective frames 5, 7, (see FIGS. 2 and 3). The front lateral structural frames 11(a) of the support means 11 are pivotally mounted at a predetermined equal distance from the longitudinal centerline C of the carrier 1, see FIGS. 2 and 3. These lateral structural frames 11(a) are adapted to pivot outwardly, either separately or concurrently, with respect to their common center line C. Thus, it is clear in viewing FIGS. 2 and 3 that the left hand support means would pivot counter-clockwise while the right hand support means would pivot clockwise in order to deposit the cargo on the ground.

The rear support means 13 are similarly affixed to rear frame means 7 by a pivot connection. The pivoted connection 21 may be the same on both the front and rear portions of the carrier. The rear support means pivot 21 is however mounted a greater distance from the centerline C than are the front pivots. For example, in a carrier having a length of approximately 30 feet, the rear support means pivots may be disposed at a distance of 3 inches or more greater than the distance of the front support means pivots from the carrier centerline C. In this manner it will be recognized that the presence of a common load such as the truss T on the front and rear support means will result in an outward disposition of the rear portion of the truss when the structural frames are pivoted and that the rear portion of the truss will be deposited on the ground at a greater distance from the centerline C than the front portion of the rear pivoted connection 21 from the centerline is so calculated and disposed on rear frame means 7 as to assure that outward pivotal movement of the structural frame 13(a) will result in unloading of the truss exteriorly of wheels 15. Similarly, the positioning of front pivot 21 is so calculated and disposed as to insure that outward pivotal movement of the structural frames 11(a) results in unloading of the front portion of trusses T upon the ground exteriorly of the front wheels so as to thereby clearly enable the carrier 1 to either back up or pull away from the deposited load without hitting any of the trusses with the wheels.

Each of the front and rear frames means has structurally affixed thereto a central standard 23 which extends upwardly above centerline C. The standard 23 includes at its upper end a rest 25 which is adapted to receive the front and rear lateral structural frame 11(a), 13(a) when the frames are in their locked, upright position, such as the case during transportation of a load. Locking means 27 comprising a locking pin and bore may be provided at the upper end of standard 23 for securing the lateral structural frames 11(a), 13(a), during movement. There is also provided at the upper end of the lateral structural frames 11(a ), 13(a) a lateral beam 11(b), 13(b). The beams 11(b), 13(b) are affixedly secured to the frames and are adapted to normally engage the rest 25 at their inner ends when carrying a load T. The outer ends of lateral beams 11(b), 13(b) are characterized by rotating load stoppers 11(c), 13(c). The load stoppers may take varying forms but may, for exemplary purposes, consist of ellipsoidal bearing plates axially mounted in the beams 13(a), 13(b) so as to rotate from a first vertical position (see FIG. 1) wherein their major axis is vertically aligned to a second position wherein their major axis is horizontally aligned. In the latter position the load stoppers 11(c), 13(c) permits the trusses T to be easily slid over the beams 11(b), 13(b) and off onto the ground. In the former position the stoppers 11(c), 13(c ) preclude removal of the trusses from the surface of the lateral beams. It is of course in this position that the stoppers reside when the trusses are being carried from one location to another and in the horizontal position when the trusses are being loaded.

In operation, the lateral unloading carrier is first driven to the position where unloading is to occur. The locking means on the front and rear cooperating support means is then released so that at least one pair of front and rear support means may be prepared for pivotal unloading. Also, the load stoppers 11(c), 13(c) are positioned so as to permit sliding removal of the trusses T from the carrier. Either one or both of the powered actuators 33 which engage the lateral structural frames 13(a) are then actuated so as to cause outward pivotal movement of the rear support means 13. As said rear support means traverses its outward pivotal movement, it carries outwardly thereon the load T which rests upon the lateral beams 13(b). Movement of the lateral beams outwardly, and the concomitant movement of the trusses T thereon produces a similar outwardly directed force upon the lateral beam 11(b) of front support 11. Relatively small angular pivotal movement of rear support means 13 causes the apex of truss T to come in contact with the ground so that the subsequent "following movement" of front support means assists in depositing the full weight of the load T upon the ground after an initial contact has been made thereby precluding the sudden contact with the ground by the full weight of the load that has been normally experienced heretofore with lateral unloading carriers. After the apex of the load T has contacted the ground continued pivotal movement of the rear support means 13 is accomplished until front support means 11 has pivoted sufficiently to induce the load T to slide off of both the front lateral beam 11(b) and the rear lateral beam 13(b). At such time the carrier 1 may be driven from the unloading site without concern for running over any of the unloaded trusses, this because of the disposition of the front and rear pivots outside of the tracks of wheels 15.

Therefore that which is claimed and desired to be secured by United States Letters Patent is:

1. In a lateral unloading carrier of the type generally comprising front and rear frame means connected to one another by a chassis having a central axis, and including a pair of load support means pivotally affixed to each said frame means so that each of said pair is adapted to pivot laterally of the central axis, the improvement comprising pivotally affixing each of one of said pairs of load support means on one of said frame means on either side of said central axis at a first given distance therefrom, pivotally affixing each of said other pair of load support means on the other of said frame means on either side of said central axis at a second given distance therefrom which is greater than the first given distance, each of said pair of load support on the rear frame means being adapted to cooperate with each of the front load support means on the corresponding side of the central axis so that lateral pivoting of either of said other pair of load support means results in a following pivotal movement by its cooperating load support means when a common load is carried by both of them.

2. The improved lateral unloading carrier of claim 1 wherein the load support means are characterized by lateral beams for receiving the load thereon, each said beam having a distal end remote from said central axis, and load stopper means movably affixed to each beam at its distal end for precluding the load from falling off the end thereof, said load stopper means being adapted to move to a nonobstructing position discharge of the load off the end of the beam.

3. The improved lateral unloading carrier of claim 2 wherein said load support means are further characterized by a lateral structural plate of triangular form and in which the apex is substantially at the pivot point, with said lateral beam being affixed to the base, and a longitudinal structural plate bisecting the altitude of said lateral structural plate and affixed thereto with its apex facing said lateral structural beam and its base being aligned with the pivot axis so as to thereby form a substantial and reliable load support means.

4. The improved lateral unloading carrier of claim 3 wherein actuator means is operatively connected to each of said other load support means for selectively moving them to pivot laterally for discharging the load.

5. The improved lateral unloading carrier of claim 2 wherein actuator means is operatively connected to each of said other load support means for selectively moving them to pivot laterally for discharging the load.

6. The improved lateral unloading carrier of claim 1 wherein actuator means is operatively connected to each of said other load support means for selectively moving them to pivot laterally for discharging the load.

7. The improved lateral unloading carrier of claim 1 wherein said load support means are characterized by a lateral structural plate of triangular form and in which the apex is substantially at the pivot point, with said lateral beam being affixed to the base, and a longitudinal structural plate bisecting the altitude of said lateral structural plate and affixed thereto with its apex facing said lateral structural beam and its base being aligned with the pivot axis so as to thereby form a substantial and reliable load support means.

8. The improved lateral unloading carrier of claim 1 wherein the lateral beams of the front and rear load support means are substantially the same length so as to enhance deliberate movement of the load to the ground when one of the load support members moves before the other.

9. The method of lateral unloading a cargo of building structures with a minimum of damage comprising the steps of:

providing a first pivotally mounted support means disposed with reference to a parallel central axis, providing a second pivotally mounted support means disposed with reference to a parallel central axis but at a greater distance therefrom than said first pivotally mounted support means, both said support means being adapted to jointly carry the cargo of building structures;

moving said second pivotally mounted support means about its pivot so that the building structures thereon will move toward the ground while still carried by the first support means, continuing movement of the second support means and causing the first support means to pivot in a following path due to the pull of the common cargo so as to thereby deposit the cargo to the ground.

* * * * *